United States Patent
Wilson et al.

(10) Patent No.: US 8,737,491 B1
(45) Date of Patent: May 27, 2014

(54) ANALOG-TO-DIGITAL CONVERTER BASED DECISION FEEDBACK EQUALIZATION

(75) Inventors: Thomas Evan Wilson, Laurel, MD (US); Eric Harris Naviasky, Ellicott City, MD (US)

(73) Assignee: Cadence Design Systems, Inc., San Jose, CA (US)

( * ) Notice: Subject to any disclaimer, the term of this patent is extended or adjusted under 35 U.S.C. 154(b) by 347 days.

(21) Appl. No.: 12/860,379

(22) Filed: Aug. 20, 2010

(51) Int. Cl.
H04B 14/06 (2006.01)

(52) U.S. Cl.
USPC .......................................... 375/246; 375/244

(58) Field of Classification Search
USPC .......................................................... 375/246
See application file for complete search history.

(56) References Cited

U.S. PATENT DOCUMENTS

| | | | |
|---|---|---|---|
| 5,319,674 A | 6/1994 | Cherubini | |
| 6,798,832 B1 * | 9/2004 | Nakata et al. | 375/233 |
| 7,242,712 B1 * | 7/2007 | Katic | 375/233 |
| 7,330,508 B2 * | 2/2008 | Momtaz | 375/233 |
| 7,616,701 B2 | 11/2009 | Ungerboeck | |
| 7,646,323 B2 * | 1/2010 | Pickering | 341/158 |
| 7,746,969 B2 * | 6/2010 | Bryan et al. | 375/349 |
| 7,924,942 B2 | 4/2011 | Rexberg | |
| 7,978,117 B2 * | 7/2011 | Jeon et al. | 341/163 |
| 2002/0181573 A1 * | 12/2002 | Dohmen et al. | 375/229 |
| 2004/0246007 A1 | 12/2004 | Fallot-Burghardt | |
| 2007/0063770 A1 * | 3/2007 | Rexberg | 330/149 |
| 2007/0133713 A1 | 6/2007 | Dalipi | |
| 2007/0230640 A1 * | 10/2007 | Bryan et al. | 375/349 |
| 2008/0002778 A1 | 1/2008 | Said et al. | |
| 2008/0043830 A1 * | 2/2008 | Simpson et al. | 375/233 |
| 2008/0192640 A1 * | 8/2008 | Simpson | 370/249 |
| 2008/0219390 A1 * | 9/2008 | Simpson et al. | 375/355 |
| 2009/0102692 A1 * | 4/2009 | Pickering | 341/155 |
| 2009/0245448 A1 * | 10/2009 | Ran et al. | 375/373 |
| 2010/0046601 A1 * | 2/2010 | Momtaz et al. | 375/233 |
| 2010/0156692 A1 * | 6/2010 | Jeon et al. | 341/162 |
| 2010/0164770 A1 | 7/2010 | Wan et al. | |
| 2011/0040929 A1 | 2/2011 | Kim et al. | |
| 2011/0063147 A1 | 3/2011 | Yoshioka | |
| 2011/0235696 A1 * | 9/2011 | Momtaz | 375/233 |
| 2012/0007756 A1 | 1/2012 | Agazzi | |
| 2012/0044983 A1 * | 2/2012 | Kerr | 375/233 |
| 2012/0314756 A1 * | 12/2012 | Leibowitz et al. | 375/233 |

OTHER PUBLICATIONS

Mike Harwood et al., ISSCC 2007 Session 24 Multi-GB/s Transceivers 24.1, "24.1 A 12.5Gb/s SerDes in 65nm CMOS Using a Baud-Rate ADC with Digital Receiver Equalization and Clock Recovery," Texas Instruments, pp. 436-437, 613.

(Continued)

*Primary Examiner* — Chieh Fan
*Assistant Examiner* — Santiago Garcia
(74) *Attorney, Agent, or Firm* — Holland & Knight LLP; Mark H. Whittenberger, Esq.

(57) ABSTRACT

The present disclosure relates to a method for Analog-to-Digital Converter Based Decision Feedback Equalization. The method may include providing an integrated circuit including a SERDES circuitry having a transmit circuitry and a receiver circuitry and receiving a high-speed data stream at the receiver circuitry. The method may also include converting the high-speed data stream to a digital signal using a successive approximation analog-to-digital converter and providing the digital signal to a digital decision feedback equalization circuitry via the successive approximation analog-to-digital converter. The method may also include generating an output signal at a phase locked loop and receiving the output signal at a multi-loop clock and data recovery circuitry.

21 Claims, 6 Drawing Sheets

(56) References Cited

OTHER PUBLICATIONS

Tony Beukema et al., "A 6.4-Gb/s CMOS SerDes Core With Feed-Forward and Decision-Feedback Equalization," IEEE Journal of Solid-State Circuits, vol. 40, No. 12, Dec. 2005, pp. 2633-2645.

Ahmed Adel Abd El-Fattah et al., Equalizer Implementation for 10 Gbps Serial Data Link in 90 nm CMOS Technology, IEEE ICM-Dec. 2007, 4 pages.

Afshin Momtaz et al., "A Fully Integrated 10Gbps Receiver with Adaptive Optical Dispersion Equalizer in 0.13um CMOS," IEEE 2006 Symposium on VLSI Circuits Digest of Technical Papers, 2 Pages.

John F. Bulzacchelli et al., "A 10-Gb/s 5-Tap DFE/4-Tap FFE Transceiver in 90-nm CMOS Technology," IEEE Journal of Solid-State Circuits, vol. 41, No. 12, Dec. 2006, pp. 2885-2900.

Shoujun Wang et al., "Design Considerations for 2nd-Order and 3rd-Order Bang-Bang CDR Loops," IEEE 2005 Custom Integrated Circuits Conference., 2005, pp. 317-320.

N. Dodel et al., "10Gb/s Bang-Bang Clock for Data Recovery (CDR) for Optical Transmission Systems," Advances in Radio Science, 3, 2005, pp. 293-297.

Richard C. Walker, "Designing Bang-Bang PLLs for Clock and Data Recovery in Serial Data Transmission Systems," Agilent Laboratories, Palo Alto, CA, pp. 1-12.

\* cited by examiner

ANALOG-TO-DIGITAL CONVERTER BASED DECISION FEEDBACK EQUALIZATION

FIELD OF THE INVENTION

The present disclosure relates to decision feedback equalization, and more specifically, to analog-to-digital converter based decision feedback equalization.

DISCUSSION OF THE RELATED ART

Serializer/deserializer ("SerDes") components are becoming common on integrated System-on-a-chip ("SOC") and Application Specific Integrated Circuits ("ASICs"). The trend has involved increasing the number of serial links at higher and higher speeds in smaller geometry processes. This may be necessary in order to provide the data transmission requirements of higher capacity chips that are severely pin limited. A high speed serial link requires data and clock recovery for wired applications such as backplanes, networks and chip to chip communication. Some industry standards for this type of communication include but are not limited to, Peripheral Component Interconnect Express ("PCIe"), Common Electrical Interface ("CEI-6"), 10 Gigabit Attachment Unit Interface ("XAUI") (IEEE 802.3ae), Serial ATA ("SATA"), Fibrechannel, 802.3ap (e.g., 10 GBASE-KR) and others. In this way, transfer data rates from 2.5 Gb/s, up to as high as 20 Gb/s are becoming common.

In many of these applications, the long physical length of the boards, cables, connectors and backplanes, as well as the losses in the integrated circuit ("IC") package may all contribute to bandwidth limited channels. These channels may include reflections and crosstalk that degrade the received data. As speeds increase to 20 Gbs these effects are becoming more and more severe. These types of applications, and others, need a low power, low area <90 nm complementary metal oxide semiconductor ("CMOS") receiver having an equalization and clock data recovery mechanism that can be integrated in large numbers into a large digital ASIC.

Receiver data recovery may often involve providing some level of equalization to mitigate the signal degradation that occurred during transmission. For receivers this often takes one of two forms, linear equalization or decision feedback equalization ("DFE"). Additionally these can be combined with feed forward equalization ("FFE") to transmit pre and post-cursor emphasis in order to allow the transmitter to shift energy into the precursor or post-cursor portions of the signal without changing the overall power consumption. Linear equalizers boost high frequencies to compensate for channel response losses using bandwidth peaking of the frequencies where data is present. For more complex responses DFE is used. DFE equalizers may base equalization on the sliced values of the neighboring bits and factor in the previous decisions that were made when making the next decision. Slicing can be defined generally as determining the voltage level of an input signal to be above or below a voltage threshold. This "slicing" may prevent adding noise from neighboring bits to the decision process. Additionally, previous decisions must be stored and acted upon very quickly, which can lead to high power and area solutions. Generally, FFE is the process of taking preceding samples and adding a portion to the current signal. This is useful, for example, in optical systems in which dispersion causes some portion of the signal to arrive earlier than the main signal. Transmit tap emphasis is a way of counteracting the channel impulse response by pre-conditioning the drive signal to a signal approximating the inverse of the channel response.

Analog DFE is used for multi-gigabit SerDes applications because the data rate is so high that digitizing the data was felt to be unfeasible. While analog DFE may require relatively low power and area, the analog loop between the previous sample and weight to the current sample must be closed at 10 GHz and above. This circuit must be highly accurate and linear or it may limit the amount of equalization that is obtained. Typically an analog DFE circuit must be implemented in a hard macro where the equalization algorithm, tap locations, and tap values are limited. In the future, there may likely be an increasing need for crosstalk and echo-cancellation in the DFE requiring digital signal processing. Generally, digital DFE systems are common for lower speed Ethernet, optical and wireless applications. However, in SerDes applications they may require a highly linear calibrated flash analog-to-digital converter at the front end (e.g., approximately 4 to 6 bits at 12.5G samples per second) as well as complex processing logic. Further, low latency is necessary in order to allow clock recovery to be overlaid. Current approaches also require complex and high power processing logic to train the equalization coefficients and process the incoming samples at such high data rates.

SUMMARY OF INVENTION

In one embodiment of the present disclosure a method for Analog-to-Digital Converter Based Decision Feedback Equalization is provided. The method may include providing an integrated circuit including a SERDES circuitry having a transmit circuitry and a receiver circuitry and receiving a high-speed data stream at the receiver circuitry. The method may also include converting the high-speed data stream to a digital signal using a successive approximation analog-to-digital converter and providing the digital signal to a digital decision feedback equalization circuitry via the successive approximation analog-to-digital converter. The method may also include generating an output signal at a phase locked loop and receiving the output signal at a multi-loop clock and data recovery circuitry.

One or more of the following features may be included. The multi-loop clock and data recovery circuitry may include at least one of a Mueller-Muller clock and data recovery loop and a Bang-Bang clock and data recovery loop. The Mueller-Muller clock and data recovery loop may include a Mueller-Muller circuitry and a phase interpolator. The Bang-Bang clock and data recovery loop may include at least one of a Bang-Bang circuitry, a phase interpolator, and an IQ sampler. The Mueller-Muller clock and data recovery loop may be configured to perform a phase matching operation. The Bang-Bang clock and data recovery loop may be configured to perform a frequency matching operation. The Mueller-Muller circuitry may be configured to receive an output from a comparator circuitry associated with the digital decision feedback equalization circuitry. The phase interpolator may be configured to provide an adjusted input signal to the successive approximation analog-to-digital converter, the adjusted input signal may be generated from the multi-loop clock and data recovery circuitry.

In another embodiment of the present disclosure an apparatus is provided. The apparatus may include an integrated circuit (IC) configured to receive a high-speed data stream at a receiver circuitry associated with a SERDES circuitry. The receiver circuitry may include a successive approximation analog-to-digital converter configured to receive the high-speed data stream and to convert the high-speed data stream to a digital signal. The successive approximation analog-to-digital converter may be further configured to provide the digital signal to a digital decision feedback equalization circuitry. The IC may be further configured to generate an output signal at a phase locked loop and to receive the output signal at a multi-loop clock and data recovery circuitry.

One or more of the following features may be included. The multi-loop clock and data recovery circuitry may include at least one of a Mueller-Muller clock and data recovery loop and a Bang-Bang clock and data recovery loop. The Mueller-Muller clock and data recovery loop may include a Mueller-Muller circuitry and a phase interpolator. The Bang-Bang clock and data recovery loop may include at least one of a Bang-Bang circuitry, a phase interpolator, and an IQ sampler. The Mueller-Muller clock and data recovery loop may be configured to perform a phase matching operation. The Bang-Bang clock and data recovery loop may be configured to perform a frequency matching operation. The Mueller-Muller circuitry may be configured to receive an output from a comparator circuitry associated with the digital decision feedback equalization circuitry. The phase interpolator may be configured to provide an adjusted input signal to the successive approximation analog-to-digital converter, the adjusted input signal may be generated from the multi-loop clock and data recovery circuitry.

In yet another embodiment of the present disclosure, a computer-readable storage medium having stored thereon instructions that when executed by a machine result in a number of operations is provided. Some operations may include receiving a high-speed data stream at a receiver circuitry associated with a SERDES circuitry and converting the high-speed data stream to a digital signal using a successive approximation analog-to-digital converter. Operations may further include providing the digital signal to a digital decision feedback equalization circuitry via the successive approximation analog-to-digital converter.

One or more of the following features may be included. The multi-loop clock and data recovery circuitry may include at least one of a Mueller-Muller clock and data recovery loop and a Bang-Bang clock and data recovery loop. The Mueller-Muller clock and data recovery loop may include a Mueller-Muller circuitry and a phase interpolator. The Bang-Bang clock and data recovery loop may include at least one of a Bang-Bang circuitry, a phase interpolator, and an IQ sampler. The Mueller-Muller clock and data recovery loop may be configured to perform a phase matching operation. The Bang-Bang clock and data recovery loop may be configured to perform a frequency matching operation. The Mueller-Muller circuitry may be configured to receive an output from a comparator circuitry associated with the digital decision feedback equalization circuitry. The phase interpolator may be configured to provide an adjusted input signal to the successive approximation analog-to-digital converter, the adjusted input signal may be generated from the multi-loop clock and data recovery circuitry.

Additional features and advantages of embodiments of the present disclosure may be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the present disclosure as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

The present disclosure generally relates to systems and methods incorporating analog-to-digital conversion (ADC) based decision feedback equalization. More specifically, systems and methods that may incorporate a digital successive approximation analog-to-digital converter are provided.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Figure 1:
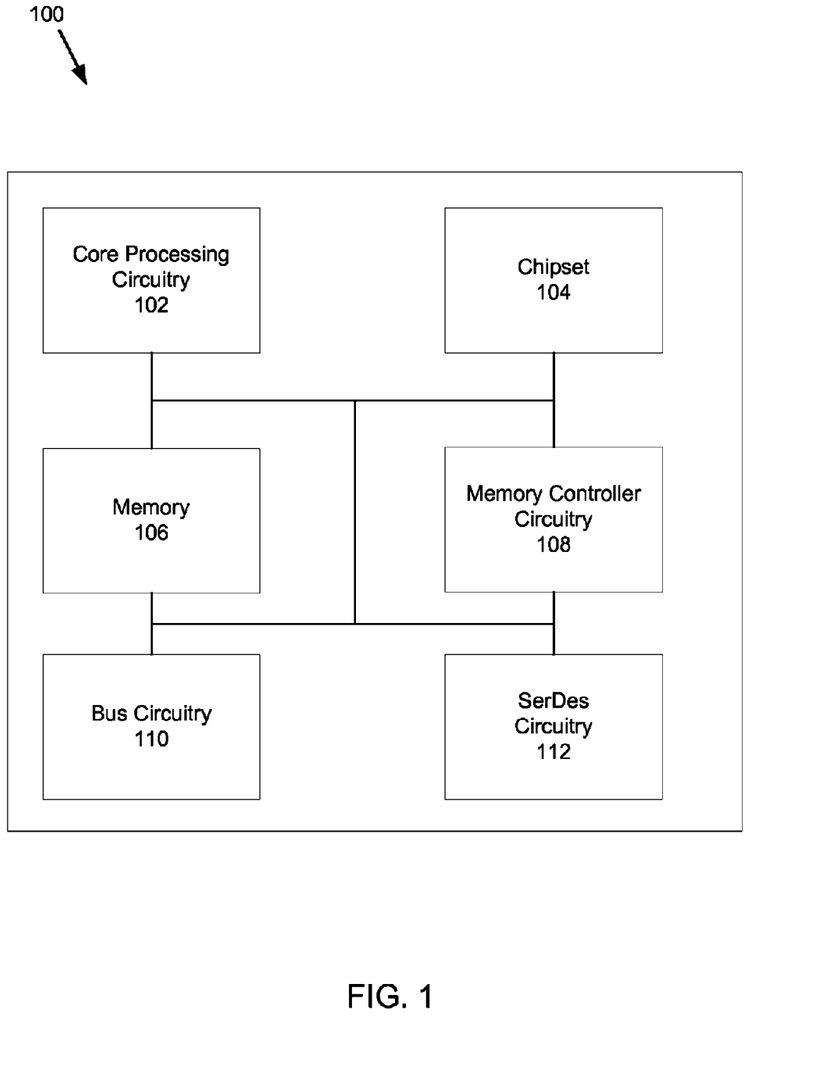
FIG. 1 is a diagram depicting an embodiment incorporating ADC-based decision feedback equalization in accordance with the present disclosure.

Referring now to FIG. 1, an exemplary embodiment of an integrated circuit (IC) 100 in accordance with the present disclosure is shown. The term "integrated circuit", as used in any embodiment herein, may refer to a semiconductor device and/or microelectronic device, such as, for example, but not limited to, a semiconductor integrated circuit chip. The specific configuration, arrangement, and components shown in IC 100 are provided merely for exemplary purposes as additional and/or alternative configurations are also within the scope of the present disclosure.

In some embodiments, IC 100 may include core processing circuitry 102, which may include a variety of different processors, e.g., an Intel® Pentium® processor. Of course, many other processors may be used without departing from the scope of the present disclosure. IC 100 may also include chipset 104. In some embodiments, chipset 104 may include both Northbridge/memory controller hub (MCH) and Southbridge/I/O controller hub (ICH) circuitry. These components may be included within chipset 104 or at any other location within IC 100. IC 100 may also include memory 106, which may be in communication with core processing circuitry 102. Memory 106 may comprise one or more of the following types of memories: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory may comprise other and/or later-developed types of computer-readable memory. In some embodiments, memory 106 may include, for example, 256 KB of two-way level 2 cache. IC 100 may additionally include memory controller circuitry 108 configured to manage the flow of data to and from memory. For example, in some embodiments, memory controller circuitry 108 may include a double-data-rate two synchronous dynamic random access memory (DDR2 SDRAM) controller. IC 100 may further include bus circuitry 110 configured to provide compatibility with a variety of different bus architectures, including, but not limited to, Universal Serial Bus (USB), Serial Advanced Technology Attachment (SATA), Peripheral Component Interface (PCI), PCI-Express and System Management Bus (SMBus).

IC 100 may also include SerDes circuitry 112, which may include numerous components configured to transceive one or more high-speed data streams. Some particular examples of the structure and operations of SerDes circuitry 112 are discussed in further detail hereinbelow.

Figure 2:
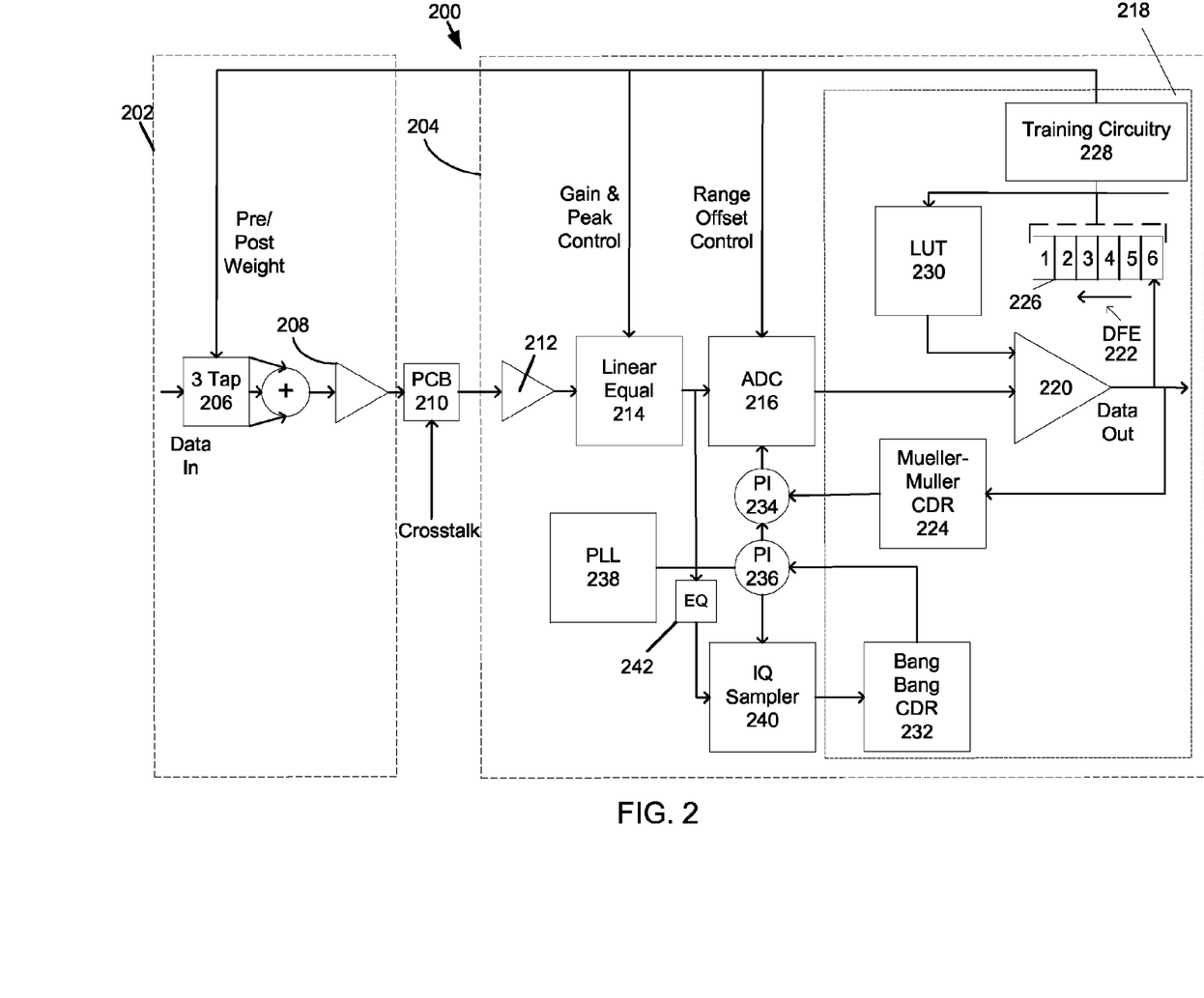
FIG. 2 is a diagram depicting an embodiment incorporating ADC-based decision feedback equalization in accordance with the present disclosure.

Referring now to FIG. 2, a diagram depicting an exemplary embodiment of SerDes circuitry 200 is provided. SerDes circuitry 200 may include transmit circuitry 202 and receiver circuitry 204, which may incorporate analog-to-digital converter based decision feedback equalization. In some embodiments, SerDes circuitry 200 may be configured to transmit and/or receive a high-speed data stream. The phrase "high-speed data stream" may refer to a data stream having a data transfer rate of approximately 100 Gb/second or more.

Generally, decision feedback equalization may operate by making decisions, then using the sequence of past decisions to add or subtract a portion of the signal from the current decision. This may help to compensate for spreading of the input signal due to bandwidth limitations and other non-idealities of the transmission channel. The number of past decisions factored in may be referred to as the number of taps. The portion added for each past decision may be referred to as the tap weight. Although some of the embodiments included herein show a five-tap DFE, it should be noted that an N tap DFE could be implemented as well.

In some embodiments, transmit circuitry 202 may include a number of components including, but not limited to, programmable pre-emphasis multi-tap circuitry 206 and driver circuitry 208. Pre-emphasis multi-tap circuitry 206 may be configured to receive a high speed data stream and to pre-emphasize the high speed data stream. Pre-emphasis multi-tap circuitry 206 may operate in conjunction with line driver circuitry 208 to generate a pre-emphasized serial data stream. This pre-emphasized serial data stream may be provided from transmit circuitry 202 to one or more printed circuit boards (PCB) 210. PCB 210 may introduce crosstalk into the system as other nearby channels may contribute unwanted noise.

The pre-emphasized serial data stream may propagate through PCB 210 to receiver circuitry 204. Receiver circuitry 204 may include a variety of different components, including, but not limited to, differential receiver circuitry 212 and programmable linear equalization circuitry 214, which may be operatively connected. Linear equalization circuitry 214 may also be coupled to analog-to-digital converter (ADC) 216. Linear equalization circuitry 214 may be configured to receive an input from differential receiver circuitry 212 and to filter the received input (e.g., in order to accentuate high or low frequencies). Linear equalization circuitry 214 may be further configured to provide this filtered output to ADC 216.

In some embodiments, ADC 216 may be a successive approximation ADC. A successive approximation ADC refers to a type of analog-to-digital converter that may be configured to convert a continuous analog waveform into a discrete digital representation via a binary search through all possible quantization levels before finally converging upon a digital output for each conversion. A SAR ADC may be implemented in small geometry processes at much lower power than a flash ADC. A SAR ADC may utilize a single comparator instead of as many as 32 comparators in a flash ADC, which may avoid the need for calibration to maintain an effective number of bits (ENOB)—one measure of the quality of a digitized signal.

ADC 216 may be configured to convert in an incoming analog high-speed data stream to generate one or more outputs in the form of a digital signal. ADC 216 may be further configured to provide the digital signal to digital decision feedback equalization circuitry 222 associated with digital receiver circuitry 218 as discussed in further detail hereinbelow.

Digital receiver circuitry 218 may include DFE circuitry 222, which may include, inter alia, comparator circuitry 220. Comparator circuitry 220 may be configured to receive one or more inputs (e.g. from ADC 216 and LUT 230) and may generate one or more outputs. The output of comparator circuitry 220 may be received by digital decision feedback equalization (DFE) circuitry 222 and/or one or more clock recovery loops, which may include, for example, Mueller-Muller clock and data recover (CDR) circuitry 224. Decision feedback equalization circuitry 222 may generally include comparator circuitry 220, look-up-tables (LUT) 230, as well as numerous other components, such as registers 226. Embodiments depicting examples of the structure and operation of digital receiver circuitry 218 are provided in FIGS. 3-4, which are discussed in further detail below. For example, one exemplary embodiment of DFE circuitry 222 is shown in greater detail in FIG. 4.

As discussed above, receiver circuitry 204 may include one or more clock and data recovery loops. In addition to Mueller-Muller CDR circuitry 224, Bang-Bang CDR circuitry 232 may be utilized. Mueller-Muller CDR circuitry 224 may include methodology similar to that described in: K Mueller, M. Muller "*Timing Recovery in Digital Synchronous Data Receivers*", IEEE Trans. on Communications, pp. 516-531, May, 1976. Bang-Bang CDR circuitry 232 may include methodology similar to that described in: N. Dodel, H. Klar, 10 *Gb/s Bang-Bang Clock and Data Recovery (CDR) for optical transmission systems*, Advances in Radio Science, vol. 3, Issue 14, p. 293-297, May 2005. The above listed references are provided merely for exemplary purposes as the clock and data recovery circuitries included herein are not intended to be limited to these particular implementations.

In some embodiments, Mueller-Muller CDR circuitry 224 and Bang-Bang CDR circuitry 232 may each be in communication with one or more phase interpolators (PIs), such as PI circuitry 234 and PI circuitry 236 to create one or more CDR loops. The Bang-Bang CDR loop (e.g., Bang-Bang CDR circuitry 232, sampling/filtering circuitry 240, and PI circuitry 236) may be used to recover frequency while the Mueller-Muller CDR loop (e.g., Mueller-Muller circuitry 224 and PI circuitry 234) may be used to recover the phase.

Receiver circuitry 204 may also include a frequency generator such as Phase Locked Loop circuitry (PLL) 238, which may be configured to generate a reference signal and to provide the reference signal to PI circuitry 236. PLL circuitry 238 may operate as a frequency generator (e.g., a crystal oscillator) to generate the reference signal, which may be an approximation of the clock entering receiver circuitry 204. This approximation may be matched exactly using one or more of the CDR loops. PI circuitries 234 and 236 may include, for example, analog circuitries, which may be configured to receive an incoming clock and to modulate its phase to get an outgoing clock having a different phase. Each of PI circuitries 234 and 236 may include a different control word in order to control how much phase shift is necessary in the clock of PLL circuitry 238 in order to match the phase of the incoming system clock.

In some embodiments, the multi-loop CDR circuitry configuration may allow for low latency unequalized data to be used for clock recovery, thus eliminating the need for a low latency ADC. One or more of the CDR loops may use digital techniques to simply remove the non-equalized to equalized data static offset, without the limitations on low latency. Clock recovery using unequalized samples in a first high-speed loop (e.g., Bang-Bang CDR circuitry 232, sampling/filtering circuitry 240, and PI circuitry 236) and a second slower loop (e.g., Mueller-Muller circuitry 224 and PI circuitry 234) may be implemented to compensate for the offset between unequalized and equalized data samples. This may allow for adequate clock recovery taking into account the large latency associated with ADC 216 and other digital processing components.

In some embodiments, PI circuitry 236 may also be operatively connected with sampling/filtering circuitry 240 (shown as IQ sampler). Sampling/filtering circuitry 240 may also be in communication with Bang-Bang CDR circuitry 232 in a pre-decision feedback equalization loop. This loop may be used to obtain timing information as well as to address jitter and noise issues.

In some embodiments, PI circuitry 234 may work in conjunction with Mueller-Muller circuitry 224 during a post-decision feedback equalization loop. This loop may be used to match the phase of the sampling/filtering circuitry 240 with that of ADC 216 in order to obtain the data when it is most valid and to address sampling time and propagation time issues. PI circuitry 234 may be configured to provide an adjusted input signal to ADC 216, the adjusted input signal may be generated from the multi-loop clock and data recovery circuitry. Mueller-Muller circuitry 224 may be configured to receive an output from comparator circuitry 220 associated with the digital decision feedback equalization circuitry 222 as is discussed in further detail below with reference to FIGS. 3-4.

In some embodiments, receiver circuitry 204 may further include frequency peaking circuitry 242, which may be configured to receive one or more signals from linear equalization circuitry and to amplify the high frequency signal prior to transmission to one or more of the CDR circuitry loops. In this way, frequency peaking circuitry 242 may be configured to assist the clock recovery loops to emphasize clock transitions at the expense of more noise. Since the CDR circuitry loops may average the transition locations SerDes circuitry 200 may tolerate the additional noise and thus improve the ability of the CDR circuitry loops to detect transitions.

Figure 3:
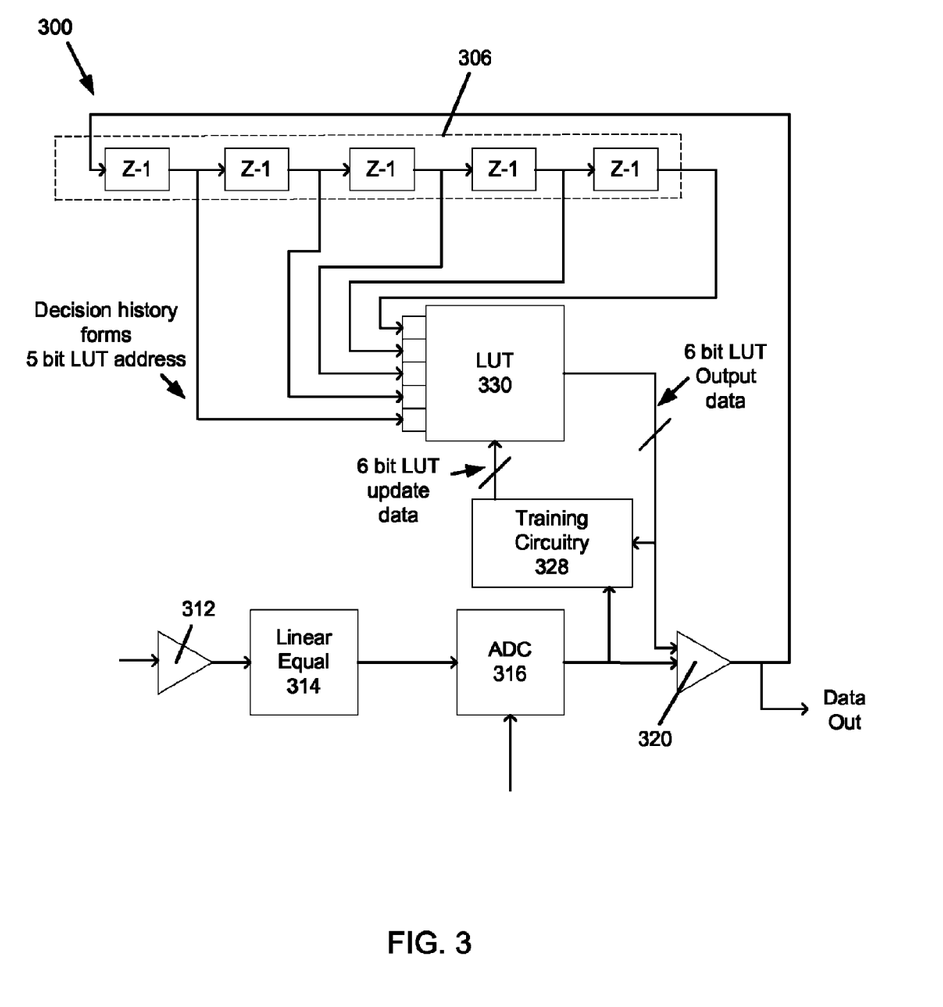
FIG. 3 is a diagram depicting an embodiment incorporating ADC-based decision feedback equalization in accordance with the present disclosure.

Referring now to FIG. 3, an exemplary embodiment of the present disclosure depicting SerDes circuitry 300 is provided. SerDes circuitry 300 may include many of the components shown in FIG. 2 and depicts a look-up-table (LUT) based approach. In some embodiments, SerDes circuitry 300 may include differential receiver circuitry 312, which may be operatively connected with programmable linear equalization circuitry 314. Linear equalization circuitry 314 may be coupled to analog-to-digital converter (ADC) 316. Linear equalization circuitry 314 may be configured to receive an input from differential receiver circuitry 312 and to filter the received input (e.g., in order to accentuate high or low frequencies). Linear equalization circuitry 314 may be further configured to provide an output to ADC 316. ADC 316 may be operatively connected with comparator circuitry 320 and training circuitry 328. Comparator circuitry 320 may be configured to receive one or more digital signals from ADC 316 as well as inputs or entry from one or more LUTs 330. Comparator circuitry 320 may also be configured to compare the digital signal from ADC 316 with one or more entries from LUT 330. Comparator circuitry 320 may be further configured to provide one or more outputs to pre-emphasis multi-tap circuitry 306. Pre-emphasis multi-tap circuitry 306 may be operatively connected with one or more LUTs 330 as is discussed in further detail hereinbelow.

As discussed above, although this particular embodiment depicts a five-tap DFE, it should be noted that an n-tap DFE could be implemented as well. Therefore, LUT 330 may be configured to store all possible n-bit sequences, where n is a number of taps (e.g., previous decisions) associated with the digital decision feedback equalization circuitry 222. In this particular example, LUT 330 may be configured to replace five tap weights with a LUT of $2^5$, or thirty-two values. Instead of storing the five tap weights directly and then performing either high speed analog or digital math upon them to calculate the thirty-two possible combinations of those five values, LUT 330 may be configured to effectively store a value for each of the thirty-two possible results of the five tap weights and the five decisions already evaluated.

In some embodiments, digital decision feedback equalization circuitry 222 may be implemented in digital form, with ADC 316 configured to digitize the incoming input data stream at its full rate. The history of decisions made may form the address to LUT 330. In this way, LUT 330 may be configured to store a value for each possible decision history. Each output value of LUT 330 may be compared using comparator circuitry 320 against the incoming data from ADC 316. If the output from ADC 316 is greater, for example, the decision is a 1, if it is less, the decision is 0. The stored threshold values within LUT 330 may be trained using training circuitry 328, which may be configured to average all of the new input values provided from ADC 316 into LUT 330. The assumption is that the incoming data during training may be random, and that all possible decision sequences are roughly equally represented. The range of input values which occur after each possible bit sequence may represent a histogram of 1's and 0's. The center of this histogram should be the proper place for slicing this histogram to sort 1's and 0's.

In some embodiments, training circuitry 328 may be operatively connected with ADC 316 as well as LUT 330. Training circuitry 328 may be configured to update LUT 330 using one or more training operations. In some embodiments, training circuitry 328 may utilize, at least in part, a least-means-squares algorithm. In this particular embodiment, the thirty-two coefficients associated with LUT 330 may be trained directly and individually, rather than training the five tap weights and relying on computations to create the thirty-two coefficients for each possible decision history. One advantage gained from this approach is that any non-linearity and asymmetry present in differential receiver circuitry 312, ADC 316, and other components, may not factor into the calculation of the slicing threshold. In contrast, a traditional analog decision feedback equalization approach must be made highly linear over a large dynamic range in a small geometry process to prevent the error of this calculation from being the dominant factor in the signal to noise of the system.

In some embodiments, training circuitry 328 may implement the following algorithms shown in Equations 1-4:

(New LUT value)$_n$=(Old LUT value)$_n$*Leakage+
    (ADC Input Value)(1−Leakage)      Equation 1:

LUT<=ADC*Leakage+LUT*(1−Leakage)      Equation 2:

LUT<=ADC*Leakage+LUT−LUT*Leakage      Equation 3:

LUT/Leakage<=ADC+LUT/Leakage−LUT      Equation 4:

Where Leakage is a value near but <1; and
n is 1 of 32 possible bit sequences

The algorithm may be reduced to an efficient digital calculation that can be performed at high speed. The LUT/Leakage calculation may be performed by making the 6 bit LUT register 32 bits wide (e.g., adding 26 less significant bits) and adding the high order bits to the low. For example, using verilog binary operations as additions may yield lut[31:0]<=ADC[5:0]+(LUT[31:0]−LUT[5:0])

As shown above in Equation 1, the one or more training operations may include calculating a new look-up-table value by multiplying an old look-up-table value with a value near but less than one to generate a first result, and multiplying (1−the value near but less than one) with an output from ADC 316 to generate a second result. The new look-up-table value may then be generated by adding the first result and the second result. Training circuitry 328 may be further configured to provide the new look-up-table value to LUT 330.

In some embodiments, pre-emphasis multi-tap circuitry 306 may include one or more fixed taps. Additionally and/or alternatively, one or more floating taps (e.g., DFE taps) that are not fixed on the five previous decisions may be employed. In operation, this may be implemented by taking a decision further back in time and using that to form an address for LUT 330. As training circuitry 328 operates on LUT 330, this may result in the new tap location contributing to the value in LUT 330 and its weight may automatically be compensated for in the slicing threshold. FFE may also be implemented with minimal digital overhead by applying a delay and add function to the incoming digital data stream.

In operation, the current value of LUT 330 may decay over time and may be replaced by a fraction of the new values. The end result is a running average of ADC input samples, which may be sorted by bit sequence. Sorting thresholds by bit sequence may allow for several powerful metrics to be measured. The difference between bit sequences that differ in only one decision is selectively a measure of the channel response for each tap. This information can be used to remotely control the equalization response associated with the transmit circuitry (e.g., transmit circuitry 202).

Figure 4:
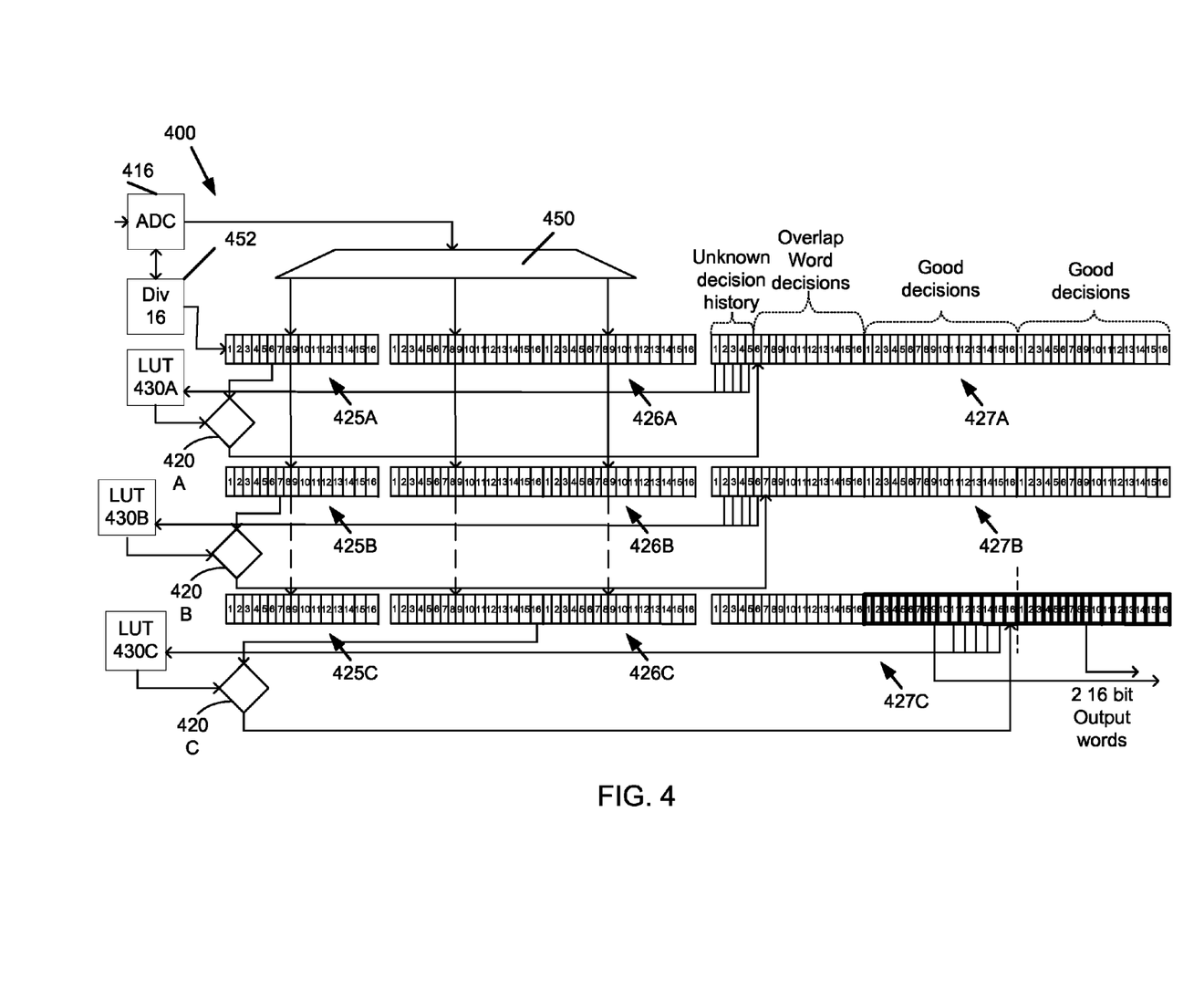
FIG. 4 is a diagram depicting an embodiment incorporating ADC-based decision feedback equalization in accordance with the present disclosure.

Referring now to FIG. 4, an embodiment depicting one exemplary parallel processing configuration of DFE circuitry 400 is provided. DFE circuitry 400 may be configured to perform one or more parallel processing operations upon a high-speed data stream. DFE circuitry 400 may include a number of different components, including, but not limited to, ADC 416, comparator circuitry 420, registers 425-427, LUT 430, demultiplexer (demux) 450, and ancillary processing circuitry 452. ADC 416, comparator circuitry 420, and LUT 430 may operate in a manner similar to that described above with reference to FIGS. 1-3.

In some embodiments, DFE circuitry 400 may utilize an overlapped digital processing algorithm that may not require any historical information from the previous samples. In this way, DFE circuitry 400 may be configured to eliminate the timing constrained complex processing that must be performed to keep up with the incoming data.

In operation, a high-speed data stream may be received at ADC 416 (e.g., a 12.5 Gbs data stream). This data stream may include one or more data words, e.g., a 6 bit data word, which may be collected into a group of 16 samples, (16×6 bit) at 644 Mhz for slower parallel processing. In some embodiments, an 800 MHz clock cycle may be required for each 6 bit sample to be evaluated. The data stream may be provided to demux 450, which may be configured to demultiplex the incoming data stream into a series of 16, 6 bit data words as shown in FIG. 4. Demux 450 may be configured to provide these data words to one or more registers. For example, demux 450 may initially provide the one or more data words to overlap register 425A and sample register 426A. In this particular example, overlap registers 425A and sample registers 426A may be configured to store 6 bits each. However, it should be noted that various other configurations and arrangements may be employed without departing from the scope of the present disclosure.

DFE circuitry 400 may also utilize an ancillary processor, such as processing circuitry 452 to perform a DFE function on the data stream at datarate/16. The result of this operation may be provided to overlap register 425A in the form of an overlap word. Thus, in this particular example, one parallel word clock cycle per calculation, may result in 16 clock cycles to process 16 samples. The implementation shown in FIG. 4 may operate on two 16×6 bit words shown in sample registers 426A and one 16×6 bit overlap word shown in overlap register 425A. Thus, it may take 48 (16×3) clock cycles to complete processing before the engine can be reloaded. Since each engine may work on 2 words at a time, 24 copies of this block may be needed to work in parallel.

DFE circuitry 400 may also include one or more decision registers 427, which may be configured to store a decision history. Decision registers 427 may be operatively connected with LUT 430 and comparator circuitry 420. For example, in one particular embodiment, each decision register 427 may be configured to store 1 bit.

In operation, DFE circuitry 400 may be configured to retrieve the decisions of the 5 previous samples from registers 427A and to read the threshold value from LUT 430 that may correspond to that 5 bit decision sequence (note that some pipelining can occur here). Comparator circuitry 420A may be configured to compare the LUT threshold value to the current 6 bit sample retrieved from overlap registers 425A. The resultant decision (greater or less than) may be stored in registers 427A. Once a decision has been made and stored, DFE circuitry 400 may shift to the next sample and repeat the process. The first 5 bits of registers 427A may correspond to an unknown decision history, i.e., random incorrect decisions. The process may begin on the $6^{th}$ bit using the MSB of the previous 5 samples as an approximate history. The process may continue upon the next bit (e.g., bit 7) in overlap register 425B. The 5 bit decision history may then shift one bit to the right as shown in decision register 427B. Here, it should be noted that each decision may be made in turn before the next decision is made.

In some embodiments, each 16×6 bit sample may not be processed until the previous 5, 6 bit samples are decided to determine decision history. The first samples in the group may require decision history that may not be calculated for another 15 clock cycles in the future by the previous engine. However, this delay may increase by 15×644 MHz clocks every 16*10 Gbs. To address this concern, DFE circuitry 400 may utilize overlap registers 425. As discussed above, each group of 16 may be processed along with an overlapped copy of the previous 16 samples. Starting at the 6$^{th}$ sample, the most significant bit (MSB) of the previous 5 samples may be used as an approximate history. The 6th to 16th sample (shown in FIG. 4 as "overlap word decisions") of the previous word may be reprocessed in order to obtain an accurate history. Inaccurate approximate history may statistically resolve before the new samples are processed. This may increase the number of required pipeline stages as well as the pipeline delay to account for the overlap. However, it may not require any critical timing events to resolve decisions on pace with the incoming data stream. In this particular embodiment, a decision was made to process words in groups of two in order to minimize the computational overhead of the overlap, resulting in 24 copies required.

Figure 5:
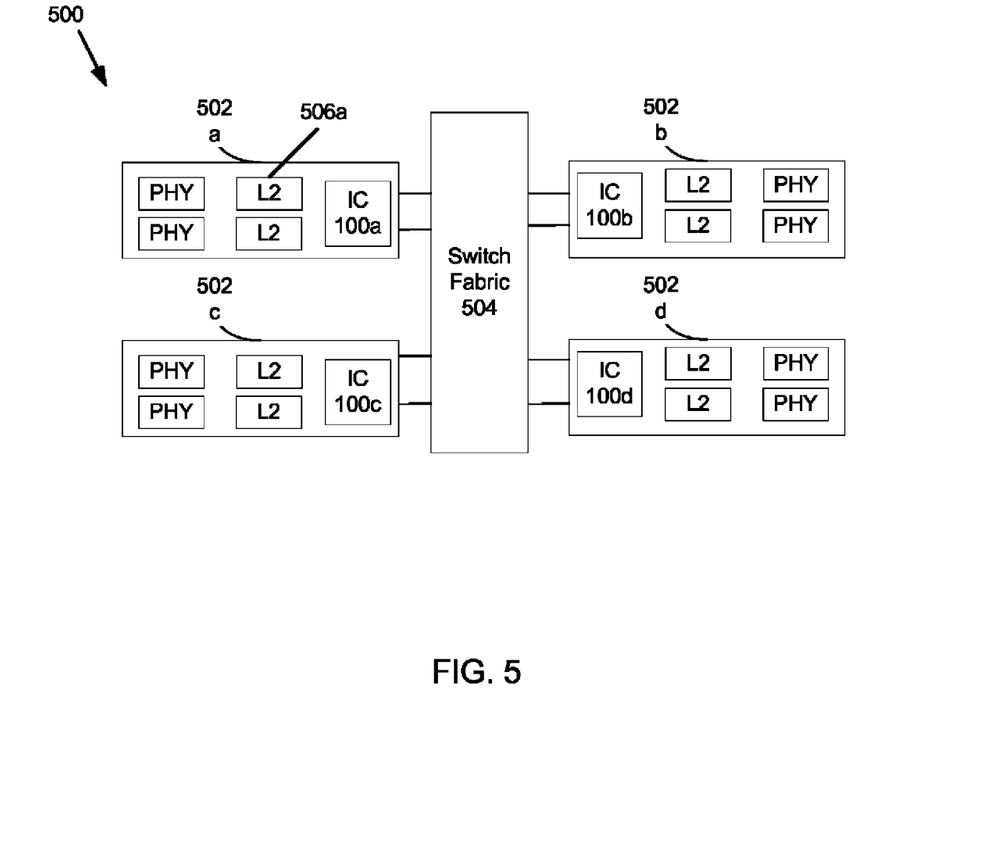
FIG. 5 is a diagram depicting an embodiment incorporating ADC-based decision feedback equalization in accordance with the present disclosure.

Referring now to FIG. 5, an exemplary system embodiment 500 in accordance with the present disclosure is provided. This embodiment may include a collection of line cards 502a, 502b, 502c and 502d ("blades") interconnected by a switch fabric 504 (e.g., a crossbar or shared memory switch fabric). The switch fabric 504, for example, may conform to CSIX or other fabric technologies such as HyperTransport, Infiniband, PCI-X, Packet-Over-SONET, RapidIO, and Utopia. Individual line cards (e.g., 502a) may include one or more physical layer (PHY) devices (e.g., optic, wire, and wireless PHYs) that handle communication over network connections. The PHYs may translate between the physical signals carried by different network mediums and the bits (e.g., "0"-s and "1"-s) used by digital systems. The line cards may also include framer devices 506a (e.g., Ethernet, Synchronous Optic Network (SONET), High-Level Data Link (HDLC) framers or other "layer 2" devices) that can perform operations on frames such as error detection and/or correction. The line cards shown may also include one or more integrated circuits, e.g., 100a, which may include any or all of the circuitry components discussed, and may be embodied as integrated circuit packages (e.g., ASICs). In addition to the operations described above with reference to integrated circuit 100, in this embodiment integrated circuit 100a may also perform packet processing operations for packets received via the PHY(s) 502a and direct the packets, via the switch fabric 504, to a line card providing the selected egress interface.

Figure 6:
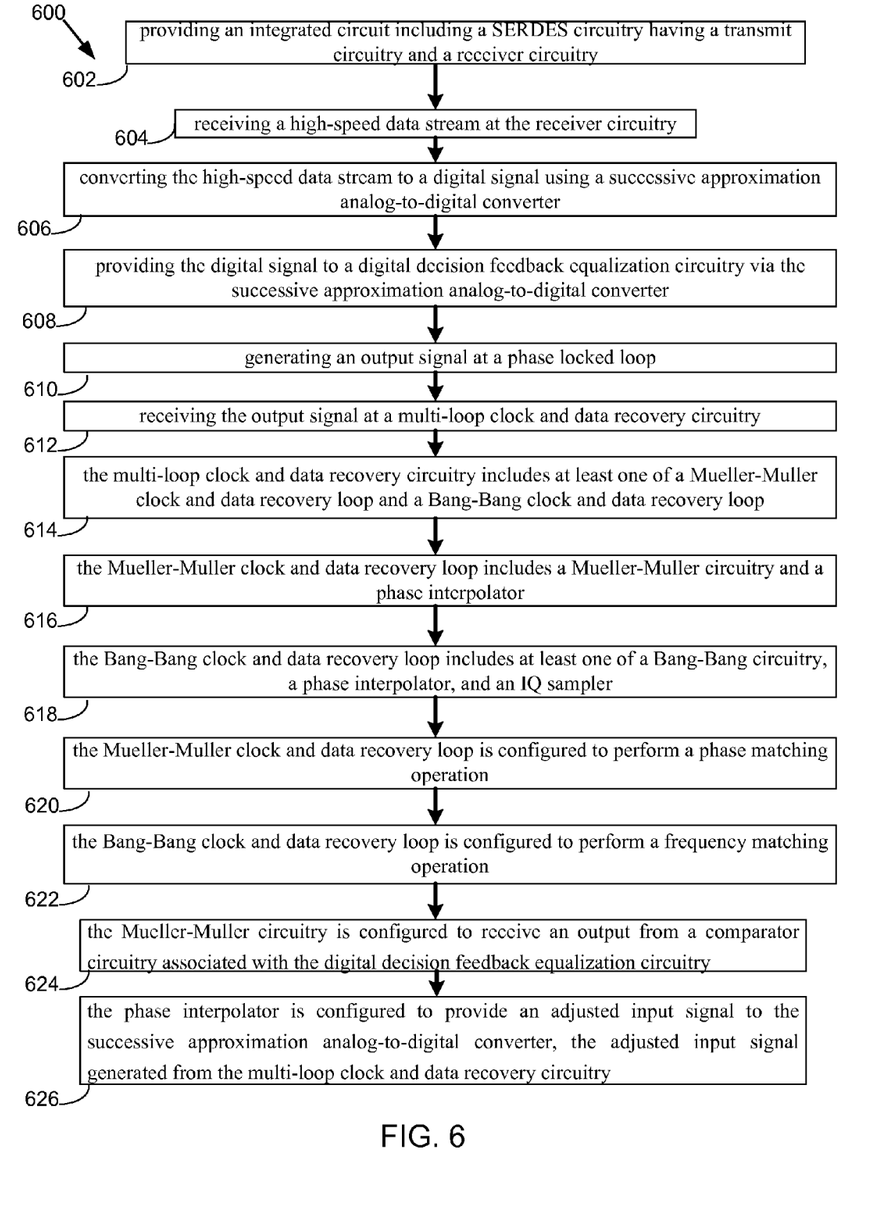
FIG. 6 is a flowchart depicting operations consistent with an embodiment incorporating ADC-based decision feedback equalization in accordance with the present disclosure.

Referring now to FIG. 6, a flowchart 600 depicting exemplary operations associated with the present disclosure is provided. Operations may include providing (602) an integrated circuit including a SERDES circuitry having a transmit circuitry and a receiver circuitry and receiving (604) a high-speed data stream at the receiver circuitry. Operations may further include converting (606) the high-speed data stream to a digital signal using a successive approximation analog-to-digital converter. Operations may also include providing (608) the digital signal to a digital decision feedback equalization circuitry via the successive approximation analog-to-digital converter. Operations may additionally include generating (610) an output signal at a phase locked loop and receiving (612) the output signal at a multi-loop clock and data recovery circuitry.

In some embodiments, the multi-loop clock and data recovery circuitry includes at least one of a Mueller-Muller clock and data recovery loop and a Bang-Bang clock and data recovery loop (614). The Mueller-Muller clock and data recovery loop includes a Mueller-Muller circuitry and a phase interpolator (616). The Bang-Bang clock and data recovery loop includes at least one of a Bang-Bang circuitry, a phase interpolator, and an IQ sampler (618). The Mueller-Muller clock and data recovery loop is configured to perform a phase matching operation (620). The Bang-Bang clock and data recovery loop is configured to perform a frequency matching operation (622). The Mueller-Muller circuitry is configured to receive an output from a comparator circuitry associated with the digital decision feedback equalization circuitry (624). The phase interpolator is configured to provide an adjusted input signal to the successive approximation analog-to-digital converter, the adjusted input signal generated from the multi-loop clock and data recovery circuitry (626). Numerous other operations are also within the scope of the present disclosure.

Embodiments of the methods described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic operations. Other embodiments may be implemented as software modules executed by a programmable control device.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A method comprising:
providing an integrated circuit including a SERDES circuitry having a transmit circuitry and a receiver circuitry;
receiving a high-speed data stream at the receiver circuitry;
converting the high-speed data stream to a digital signal using a successive approximation analog-to-digital converter;
receiving the digital signal from the successive approximation analog-to-digital converter at a comparator circuitry;
providing the digital signal to a digital decision feedback equalization circuitry via the successive approximation analog-to-digital converter;
storing a plurality of n-bit sequences using at least one look-up-table, where n is a number of taps associated with the digital decision feedback equalization circuitry;
generating an output signal at a phase locked loop; and
receiving the output signal at a multi-loop clock and data recovery circuitry, wherein the multi-loop clock and data recovery circuitry includes both a Mueller-Muller clock and data recovery loop and a Bang-Bang clock and data recovery loop.

2. The method of claim 1, wherein the Mueller-Muller clock and data recovery loop includes a Mueller-Muller circuitry and a phase interpolator.

3. The method of claim 1, wherein the Bang-Bang clock and data recovery loop includes at least one of a Bang-Bang circuitry, a phase interpolator, and an IQ sampler.

4. The method of claim 2, wherein the Mueller-Muller clock and data recovery loop is configured to perform a phase matching operation.

5. The method of claim 3, wherein the Bang-Bang clock and data recovery loop is configured to perform a frequency matching operation.

6. The method of claim 2, wherein the Mueller-Muller circuitry is configured to receive an output from a comparator circuitry associated with the digital decision feedback equalization circuitry.

7. The method of claim 6, wherein the phase interpolator is configured to provide an adjusted input signal to the successive approximation analog-to-digital converter, the adjusted input signal generated from the multi-loop clock and data recovery circuitry.

8. An apparatus, comprising:
an integrated circuit (IC) configured to receive a high-speed data stream at a receiver circuitry associated with a SERDES circuitry, the receiver circuitry including a successive approximation analog-to-digital converter configured to receive the high-speed data stream and to convert the high-speed data stream to a digital signal, the successive approximation analog-to-digital converter further configured to provide the digital signal to a digital decision feedback equalization circuitry and to a comparator circuitry, at least one look-up-table configured to store a plurality of n-bit sequences, where n is a number of taps associated with the digital decision feedback equalization circuitry, the IC further configured to generate an output signal at a phase locked loop, and to receive the output signal at a multi-loop clock and data recovery circuitry, wherein the multi-loop clock and data recovery circuitry includes both a Mueller-Muller clock and data recovery loop and a Bang-Bang clock and data recovery loop.

9. The apparatus of claim 8, wherein the Mueller-Muller clock and data recovery loop includes a Mueller-Muller circuitry and a phase interpolator.

10. The apparatus of claim 8, wherein the Bang-Bang clock and data recovery loop includes at least one of a Bang-Bang circuitry, a phase interpolator, and an IQ sampler.

11. The apparatus of claim 9, wherein the Mueller-Muller clock and data recovery loop is configured to perform a phase matching operation.

12. The apparatus of claim 10, wherein the Bang-Bang clock and data recovery loop is configured to perform a frequency matching operation.

13. The apparatus of claim 9, wherein the Mueller-Muller circuitry is configured to receive an output from a comparator circuitry associated with the digital decision feedback equalization circuitry.

14. The apparatus of claim 13, wherein the phase interpolator is configured to provide an adjusted input signal to the successive approximation analog-to-digital converter, the adjusted input signal generated from the multi-loop clock and data recovery circuitry.

15. A non-transitory computer-readable storage medium having stored thereon instructions that when executed by a machine result in the following operations:
receiving a high-speed data stream at a receiver circuitry associated with a SERDES circuitry;
converting the high-speed data stream to a digital signal using a successive approximation analog-to-digital converter;
providing the digital signal to a digital decision feedback equalization circuitry via the successive approximation analog-to-digital converter;
receiving the digital signal from the successive approximation analog-to-digital converter at a comparator circuitry;
storing a plurality of n-bit sequences using at least one look-up-table, where n is a number of taps associated with the digital decision feedback equalization circuitry;
generating an output signal at a phase locked loop; and
receiving the output signal at a multi-loop clock and data recovery circuitry, wherein the multi-loop clock and data recovery circuitry includes both a Mueller-Muller clock and data recovery loop and a Bang-Bang clock and data recovery loop.

16. The computer-readable storage medium of claim 15, wherein the Mueller-Muller clock and data recovery loop includes a Mueller-Muller circuitry and a phase interpolator.

17. The computer-readable storage medium of claim 15, wherein the Bang-Bang clock and data recovery loop includes at least one of a Bang-Bang circuitry, a phase interpolator, and an IQ sampler.

18. The computer-readable storage medium of claim 16, wherein the Mueller-Muller clock and data recovery loop is configured to perform a phase matching operation.

19. The computer-readable storage medium of claim 17, wherein the Bang-Bang clock and data recovery loop is configured to perform a frequency matching operation.

20. The computer-readable storage medium of claim 16, wherein the Mueller-Muller circuitry is configured to receive an output from a comparator circuitry associated with the digital decision feedback equalization circuitry.

21. The computer-readable storage medium of claim 20, wherein the phase interpolator is configured to provide an adjusted input signal to the successive approximation analog-to-digital converter, the adjusted input signal generated from the multi-loop clock and data recovery circuitry.

* * * * *